US006712295B2

(12) United States Patent
Frank

(10) Patent No.: US 6,712,295 B2
(45) Date of Patent: Mar. 30, 2004

(54) FUEL INJECTION VALVE FOR INTERNAL COMBUSTION ENGINES

(75) Inventor: Kurt Frank, Schorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/129,926

(22) PCT Filed: Aug. 4, 2001

(86) PCT No.: PCT/DE01/02986

§ 371 (c)(1), (2), (4) Date: Jul. 26, 2002

(87) PCT Pub. No.: WO02/23037

PCT Pub. Date: Mar. 21, 2002

(65) Prior Publication Data

US 2003/0132318 A1 Jul. 17, 2003

(30) Foreign Application Priority Data

Sep. 12, 2000 (DE) ........................................ 100 44 933

(51) Int. Cl.[7] ........................ F02M 59/00; F02M 61/00; F02M 63/00; F16L 25/00; F16L 35/00

(52) U.S. Cl. ................................ 239/533.2; 239/533.3; 239/533.9; 239/585.5; 239/600; 285/334

(58) Field of Search .......................... 239/533.2, 533.3, 239/533.9, 585.5, 600, 88–92, 585.1, 585.3, 585.4; 251/129.15, 129.21, 127; 285/334

(56) References Cited

U.S. PATENT DOCUMENTS 4,616,537 A 10/1986 Axford et al.
5,046,906 A 9/1991 Bucknell
5,746,181 A * 5/1998 Boecking et al. ........... 123/470
5,901,685 A * 5/1999 Noyce et al. ............... 123/467
5,901,941 A * 5/1999 Ricco .................... 251/129.16
5,950,600 A * 9/1999 Ricco .......................... 123/467
5,984,264 A * 11/1999 Ricco .................... 251/129.16

FOREIGN PATENT DOCUMENTS

DE 298 14 934 U 1/2000
EP 0 191 501 A 8/1986
GB 2 139 697 A 11/1984

* cited by examiner

*Primary Examiner*—Michael Mar
*Assistant Examiner*—Darren Gorman
(74) *Attorney, Agent, or Firm*—Ronald E. Greigg

(57) ABSTRACT

A fuel injection valve having a valve body, in which a bore with a pistonlike valve member disposed in it is embodied, which valve member is longitudinally displaceably in the bore counter to a closing force and by its longitudinal motion controls at least one injection opening, through which fuel can be injected into the combustion chamber of the engine. A valve holding body is braced axially against the valve body. An inlet conduit, which carries fuel at high pressure, extends through the valve holding body and its contact face, embodied as a high-pressure sealing face, on the valve body as far as the injection openings. The bracing of the valve holding body against the valve body is effected by means of a lock nut, which grips the valve body and with a female thread engages a male thread embodied on the valve holding body. The contact flank of the male thread and the contact flank of the female thread, which are pressed against one another by the bracing, are embodied substantially perpendicular to the longitudinal axis of the male thread, so that upon the bracing of the lock nut, no substantial radial forces oriented outward against the lock nut result.

3 Claims, 2 Drawing Sheets

FUEL INJECTION VALVE FOR INTERNAL COMBUSTION ENGINES

CROSS-REFERENCE TO RELATED APPLICATIONS

This application is a 35 USC 371 application of PCT/DE 00/00910 filed on Aug. 4, 2001.

BACKGROUND OF THE INVENTION

1. Field of the Invention

The invention is directed to an improved fuel injection valve for internal combustion engines, preferably internal combustion engines with self ignition.

2. Description of the Prior Art

In one known fuel injection valve, disclosed in German Utility Model 298 14 934, a bore is embodied in a valve body, and in the bore a pistonlike valve member is disposed longitudinally displaceably; by its longitudinal motion, the valve member controls the opening of at least one injection opening. The valve member is urged in the closing direction by a closing force and has a pressure face, which is disposed in a pressure chamber that can be filled with high fuel pressure. Filling the pressure chamber with fuel at high pressure makes it possible to exert a hydraulic force on the pressure face that is oriented counter to the closing force and thus brings about the opening stroke motion of the valve member. The device for generating the closing force is embodied in a valve holding body, which has a longitudinal axis and is braced axially against the valve body. A high-pressure connection is located on the valve holding body and discharges into an inlet conduit that penetrates the valve holding body longitudinally and extends through the contact face between the valve body and the valve holding body as far as the inside of the pressure chamber of the valve body. The contact face is accordingly a high-pressure sealing face and must have a correspondingly good seal.

The bracing of the valve holding body against the valve body if effected by a lock nut, which surrounds the valve body and contacts an annular-disklike contact face, embodied on the valve body, that faces away from the valve holding body. On the valve holding body, there is a male thread engaged by the lock nut with a corresponding female thread, so that the valve body is braced against the valve holding body by the screwing action of the lock nut. As a result, a good seal is achieved at the high-pressure sealing face between the valve holding body and the valve body, and the inlet conduit that passes through the high-pressure sealing face, that is, the contact face of the valve holding body at the valve body, is securely sealed off.

In the known fuel injection valves, the thread, embodied on the outer jacket face of the valve holding body and engaged by the lock nut, is embodied as a fine thread. The flanks of the thread courses form an angle of about 60° with the longitudinal axis of the thread and thus also with the longitudinal axis of the valve holding body. Thus because of the axial bracing of the lock nut, along with the axially operative force component on the screw faces, a force component acting in the radial direction to the longitudinal axis of the valve holding body is also obtained, which expands the lock nut. This limits the maximum attainable pressure per unit of surface area at the high-pressure sealing face between the valve holding body and the valve body, so that at high pressures in the inlet conduit, sealing problems can occur.

SUMMARY OF THE INVENTION

The fuel injection valve of the invention has the advantage over the prior art that the contact flanks of the male thread embodied on the valve holding body and of the female thread embodied on the lock nut are at least approximately perpendicular to the longitudinal axis of the valve holding body, so that upon the bracing of the lock nut, these contact flanks are pressed against one another without substantial radial forces on the lock nut being engendered. As a result, greater axial clamping forces can be exerted on the valve body and the valve holding body, and a higher pressure per unit of surface area can thus be achieved at the high-pressure sealing face between the two bodies. Expansion of the lock nut from radial force components thus no longer occurs. This is especially advantageous in fuel injection valves that work with a so-called common rail system, because in that case a constantly high fuel pressure prevails in the valve body.

BRIEF DESCRIPTION OF THE DRAWINGS

Other features and advantages of the invention will become apparent from the detailed description contained below, taken with the drawings, in which.

DESCRIPTION OF THE PREFERRED EMBODIMENTS

Figure 1:
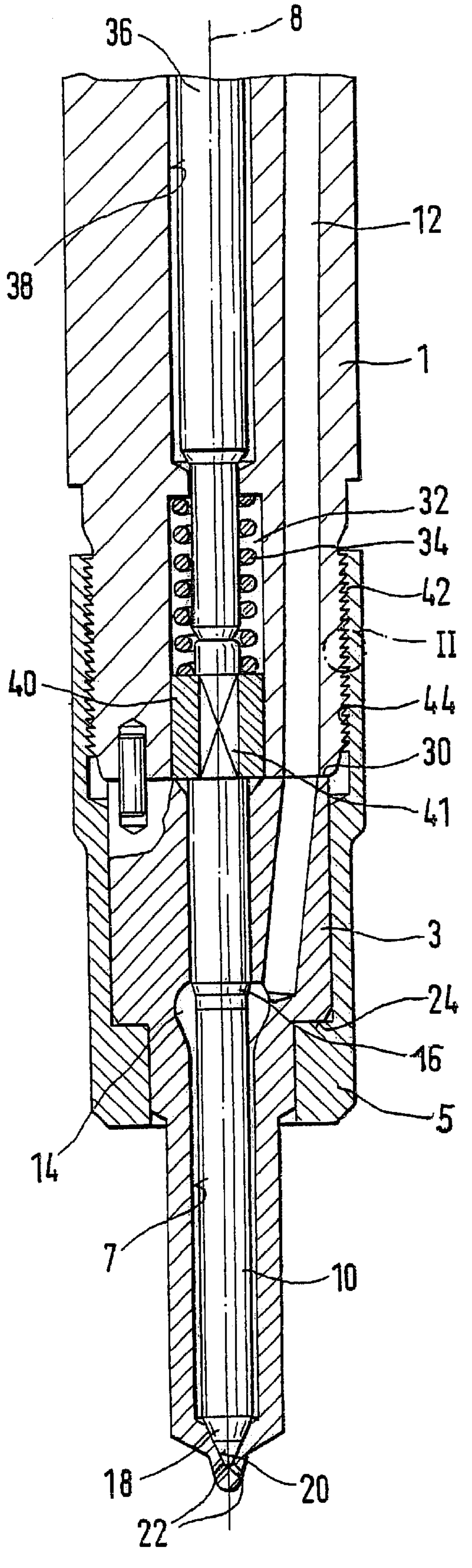
FIG. 1 is a longitudinal section through a fuel injection valve of the invention.

FIG. 1 shows a fuel injection valve of the invention in longitudinal section. A valve holding body 1 is braced axially against a valve body 3. The valve body 3 is embodied with a graduated diameter and tapers toward the combustion chamber, so that an annular-disklike contact face 24 oriented toward the combustion chamber is formed on its outer jacket face. A lock nut 5 grips the valve body 3 and rests on the contact face 24, extending to beyond the valve body 3. On the inner jacket face of the lock nut 5, at the level of the valve holding body 1, a female thread 44 is formed, which engages a male thread 42 embodied on the outer jacket face of the valve holding body 1; this male thread 42 has a longitudinal axis 8. Hence turning the lock nut 5 moves the lock nut 5 in the axial direction and thus braces the valve body 3, with its end face remote from the combustion chamber, against the valve holding body 1, so that the contact face of the valve body 3 at the valve holding body 1 is embodied as a high-pressure sealing face 30.

Embodied in the valve body 3 is a bore 7, which originates on the face end of the valve body 3 remote from the combustion chamber and changes over, on its end toward the combustion chamber, into a valve seat 20. The valve seat 20 is embodied substantially conically and has at least one injection opening 22, by way of which the bore 7 communicates with the combustion chamber of the engine. A pistonlike valve member 10 is disposed in the bore 7 and is guided sealingly in the bore 7 in a portion remote from the combustion chamber, while toward the combustion chamber it tapers, forming a pressure shoulder 16. On its end toward the combustion chamber, the valve member 10 changes over into a valve sealing face 18, which is embodied substantially conically and cooperates with the valve seat 20 to control the at least one injection opening 22. In the valve body 3, at the level of the pressure shoulder 16, a pressure chamber 14 is embodied by a radial enlargement of the bore 7; the pressure chamber continues in the form of an annular conduit, surrounding the valve member 10, as far as the valve seat 20.

An inlet conduit 12 embodied in the valve body 3 and in the valve holding body 1 discharges into the pressure chamber 14 and communicates by its other end with a source of high fuel pressure, not shown in the drawing. Via this inlet conduit 12, the pressure chamber 14 can be filled with fuel at high pressure.

In the valve holding body 1, there is a spring chamber 32 embodied as a bore, in which a guide piece 40 is disposed that is connected to the end face, remote from the combustion chamber, of the valve member 10. The guide piece 40 is embodied cylindrically here and is guided in the spring chamber 32. The guide piece 40 has at least one lateral recess 41, which connects the bore 7 to the spring chamber 32. A closing spring 34 embodied as a helical compression spring is disposed with pressure prestressing between the guide piece 40 and the end face, remote from the combustion chamber, of the spring chamber 32. This closing spring 34 surrounds a tappet 36, which is disposed in a guide bore 38 that discharges into the spring chamber 32, and with its face end toward the valve member 10, this tappet rests on the guide piece 40. By means of a device not shown in the drawing, a controllable closing force acts on the face end of the tappet 36 remote from the combustion chamber; this force is capable of urging the tappet 36 in the direction of the valve seat 20. In the closed state of the fuel injection valve, that is, when the valve sealing face 18 is resting on the valve seat 20, a predetermined high fuel pressure prevails in the pressure chamber 14 because of the communication with the high-pressure fuel source. As a result of this high fuel pressure, a hydraulic force on the pressure shoulder 16 is produced, resulting in an opening force acting on the pressure shoulder 16 in the direction away from the valve seat 20. The closing force on the tappet 36, which also acts on the valve member 10 via the guide piece 40, predominates over this opening force, however, so that the valve member 10 remains in the closing position. The closing spring 34 still has a reinforcing effect at this time. If an injection of fuel is to take place, then the closing force on the tappet 36 is reduced, and the hydraulic force on the pressure shoulder 16 is now capable of moving the valve member 10 in the opening direction, that is, away from the valve seat 20, counter to the closing force on the tappet 36 and to the spring force of the closing spring 34. As a result, the valve sealing face 18 lifts from the valve seat 20, the injection openings 22 are uncovered, and fuel flows out of the pressure chamber 14 through the injection openings 22 into the combustion chamber of the engine. Via the inlet conduit 12, fuel at high pressure is constantly resupplied from the high-pressure fuel source. The end of the injection is brought about in turn by increasing the closing force on the tappet 36, so that the valve member 10, as a result of the force ratios described above, returns to its closing position.

Figure 2:
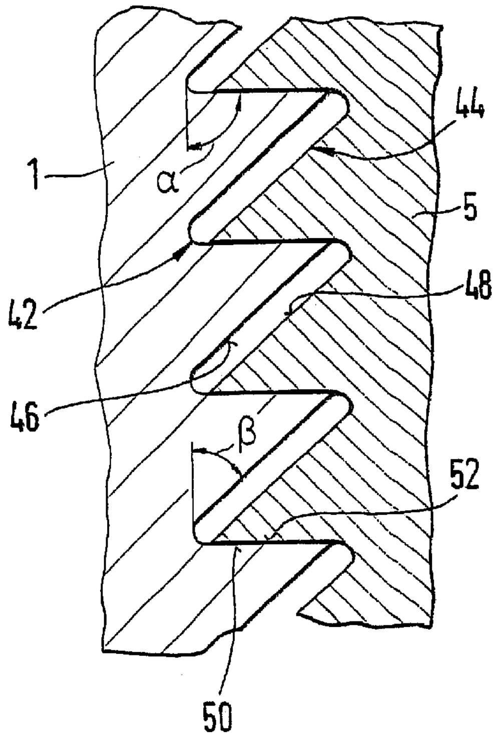
FIG. 2 shows an enlarged detail of FIG. 1 in the region of the male thread of the valve holding body.

In FIG. 2, an enlargement in the region of the overlap of the lock nut 5 and the valve holding body 1 is shown. The male thread 42 on the valve holding body 1 has an oblique flank 46 in every thread course; this flank forms an angle $\beta$ with the longitudinal axis 8 of the male thread 42. The contact flank 52 facing the oblique flank 46 conversely forms an angle $\alpha$ with the longitudinal axis 8 of the male thread 42, and this angle is preferably within the range about 85° to 95°, and more preferably approximately 90°. The female thread 44 of the lock nut 5 is embodied so that it engages the male thread 42 of the valve holding body 1. Each thread course of the female thread 44 has one oblique flank 48, which once the lock nut 5 has been screwed in faces the oblique flank 46 of the male thread 42. The two oblique flanks 46, 48 are not generally pressed together, however, since the lock nut 5 is axially braced against the valve holding body 1. The flank of the female thread 44 facing the oblique flank 48 is embodied as a contact flank 50 and is preferably within the range of about 85° to 95°, and more preferably approximately perpendicular to the longitudinal axis 8 of the valve holding body 1 and corresponding to the angle $\alpha$ of flank 52. The contact flank 50 rests on the contact flank 52 of the male thread 42, so that when the lock nut 5 is screwed in tightly, an axially acting force is transmitted from the lock nut 5 via the outer contact flank 50 onto the contact flank 52 of the male thread 42 of the valve holding body 1. Since the two contact flanks 50, 52 contacting one another are approximately perpendicular to the longitudinal axis 8 of the male thread 42 and thus also approximately perpendicular to the bracing direction of the valve body 3, there is no, or only a slight, resultant force component in the radial direction relative to the longitudinal axis 8 upon the lock nut 5. Accordingly no expansion of the lock nut 5 from the tightening occurs, and hence at the high-pressure sealing face 30, or in other words the contact face of the valve body 3 at the valve holding body 1, a very high pressure per unit of surface area can be achieved and accordingly an adequately good seal of the inlet conduit 12 at its transition from the valve holding body 1 to the valve body 3.

Figure 3:
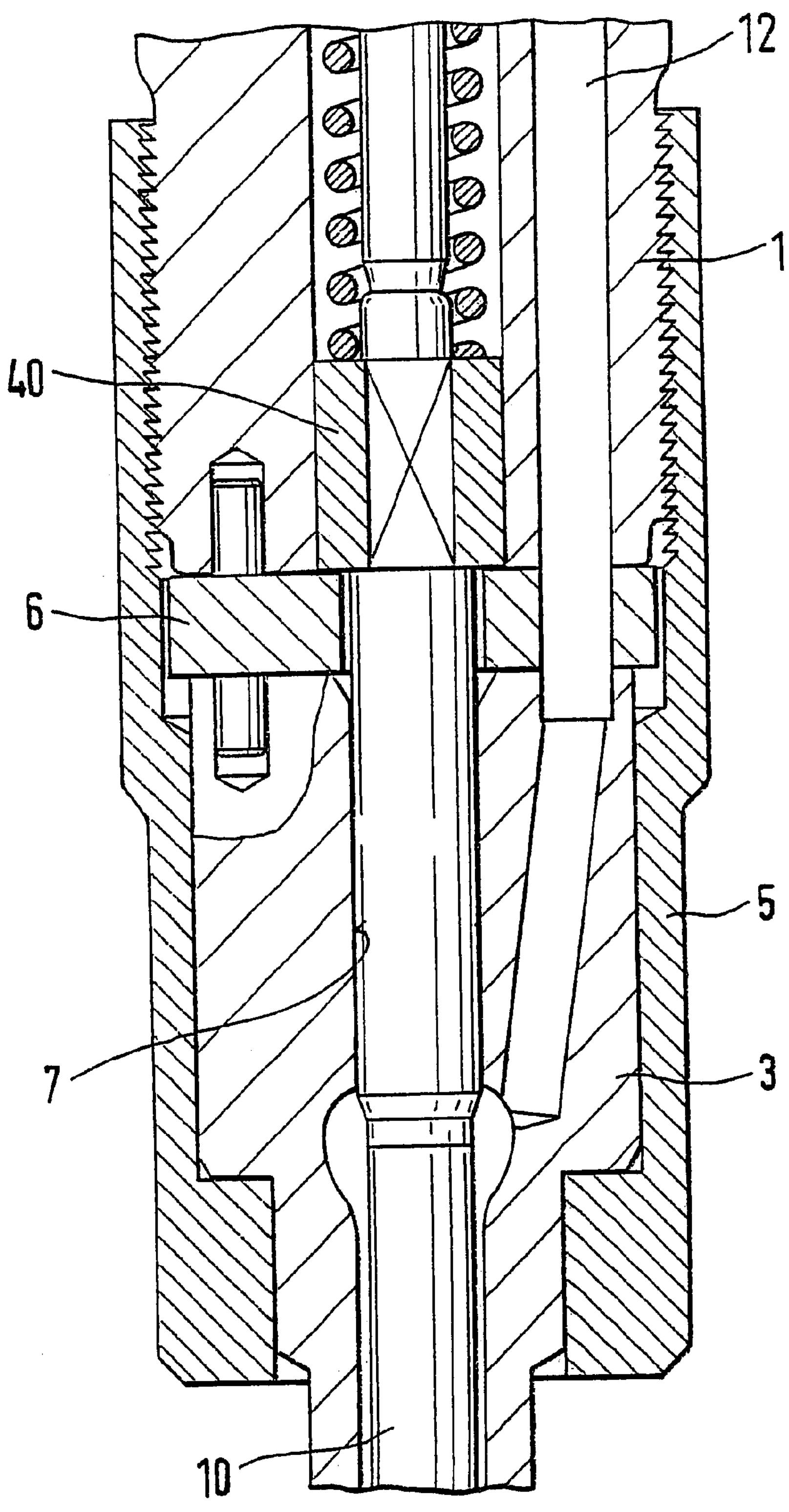
FIG. 3 shows a further exemplary embodiment of a fuel injection valve of the invention in longitudinal section.

In FIG. 3, as an alternative to the design shown in FIG. 1, a fuel injection valve is shown in longitudinal section in which there is a shim 6 between the valve holding body 1 and the valve body 3, thus creating two high-pressure sealing faces: first, at the transition from the valve holding body 1 to the shim 6, and second, from the shim 6 to the valve body 3. In this kind of design as well, because of the thread according to the invention on the inside of the lock nut and on the outer jacket face of the valve holding body 1, an optimized pressure per unit of surface area is obtained, and thus improved tightness of the inlet conduit 12 at its transition from the valve holding body 1 to the valve body 3 because of the high-pressure sealing faces.

Alternatively to the fuel injection valves shown in FIGS. 1 and 3, it can also be provided that the lock nut with its female thread engages a male thread disposed on the outer jacket face of the valve body 3. In that case, the lock nut is braced on a contact face, embodied on the valve holding body 1 facing away from the valve body 3, that in this case as well, a bracing of the valve body 3 and valve holding body 1 against one another can be effected.

The foregoing relates to preferred exemplary embodiments of the invention, it being understood that other variants and embodiments thereof are possible within the spirit and scope of the invention, the latter being defined by the appended claims.

I claim:

1. A fuel injection valve for internal combustion engines, having a valve body (3) in which, in a bore (7), a valve member (10) is longitudinally displaceable counter to a closing force by subjection of a pressure shoulder (16) to pressure by fuel, and by means of the longitudinal motion controls at least one injection opening (22), and having a valve holding body (1), which is braced in the axial direction by means of a lock nut (5) against the valve body (3), wherein the lock nut (5) has a female thread (44) which engages a male thread (42) that is embodied on an outer jacket face of the valve holding body (1) or an outer jacket face of the valve body (3) and has a longitudinal axis (8), and having an inlet conduit (12) extending in the valve holding body (1) and in the valve body (3), through which conduit, fuel can be carried at high pressure to the at least one injection opening (22) by means of a contact face, embodied as a high-pressure sealing face (30) of the valve body (3) on the valve holding body (1), the improvement wherein contact flanks (50; 52) of the female thread (44) and the male thread (42), respectively, are pressed against one another to effect bracing of the valve body (3) against the valve holding body (1), the contact flanks (50; 52) being embodied at least approximately perpendicular to the longitudinal axis (8) which is surrounded by the male thread (42) and the female thread (44).

2. The fuel injection valve of claim 1, wherein a shim (6) is disposed between the valve body (3) and the valve holding body (1).

3. The fuel injection valve of claim 1, wherein the contact flank (50) of the female thread (44) and the contact flank (52) of the male thread (42) form an angle within the range of about 85° to 95° with the longitudinal axis (8).

* * * * *